March 8, 1927.

H. A. HOESCHEN 1,619,866

PRESSURE ACTUATED CONTROL DEVICE

Filed July 19, 1926

INVENTOR
Henry A. Hoeschen.
BY
ATTORNEY

Patented Mar. 8, 1927.

1,619,866

UNITED STATES PATENT OFFICE.

HENRY A. HOESCHEN, OF OMAHA, NEBRASKA, ASSIGNOR OF ONE-HALF TO J. L. BAKER, OF OMAHA, NEBRASKA.

PRESSURE-ACTUATED-CONTROL DEVICE.

Application filed July 19, 1926. Serial No. 123,352.

My invention relates to pressure actuated control devices and more particularly to the expansible elements thereof.

It is a purpose of my invention to provide an expansible element for a pressure actuated control device such as a pressure regulator, which may be made of a tubular member, the wall portion of which is of substantially the same thickness throughout. Preferably my improved expansible element is made up of a flattened tubular member that is bent into a plurality of substantially parallel lengths connected by integral bends, said element having an inlet for a fluid pressure medium thereto and means associated therewith for operating a movable member such as the movable element of a valve.

It is a further purpose of my invention to provide a device of the above mentioned character in which it is unnecessary to provide thickened portions at the bends thereof as there is substantially no flexure at the bends as the element expands, the flexure occurring practically entirely in the adjoining lengths of the device. Furthermore, by varying the lengths of the adjoining portions of the tubular member, the degree of bending that takes place at the turns in the tube upon expansion of the device, can be varied so as to keep the same within a predetermined minimum.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

Figure 1:
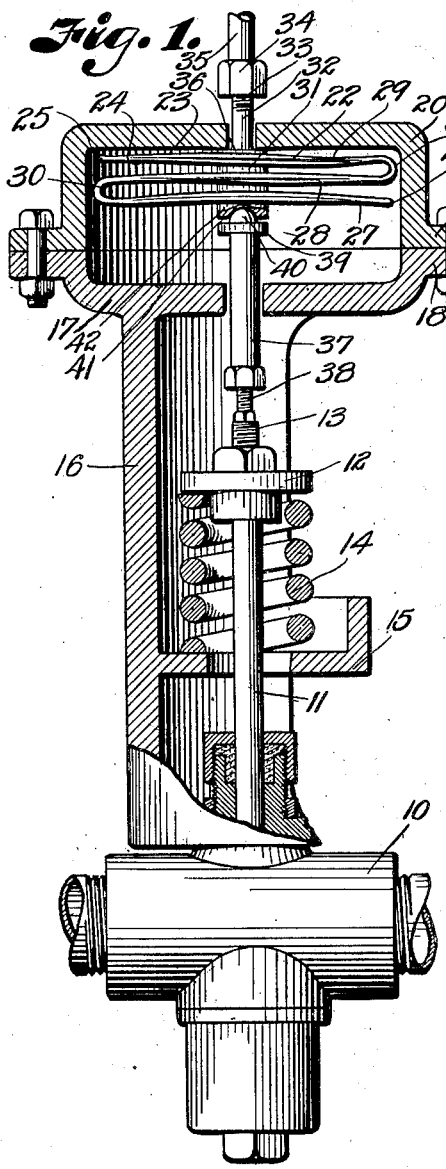
Fig. 1 is a view partly in section and partly in elevation, of a pressure controlled valve, showing my improved pressure controlled expansible element associated therewith, the expansible element being in its normal unexpanded condition.

Referring in detail to the drawings:

My improved pressure actuated control device is shown as being applied to a vaive having a casing 10 within which the movable valve member is mounted, said valve member being provided with a stem 11 having a flanged collar 12 thereon which is adjustable on the threaded end portion 13 of the stem 11 to regulate the compression of the spring 14 which is provided for holding the valve against its seat, said spring 14 being mounted between the flange 12 and a bracket 15 on the upward extension 16 provided on the valve casing 10.

Figure 2:
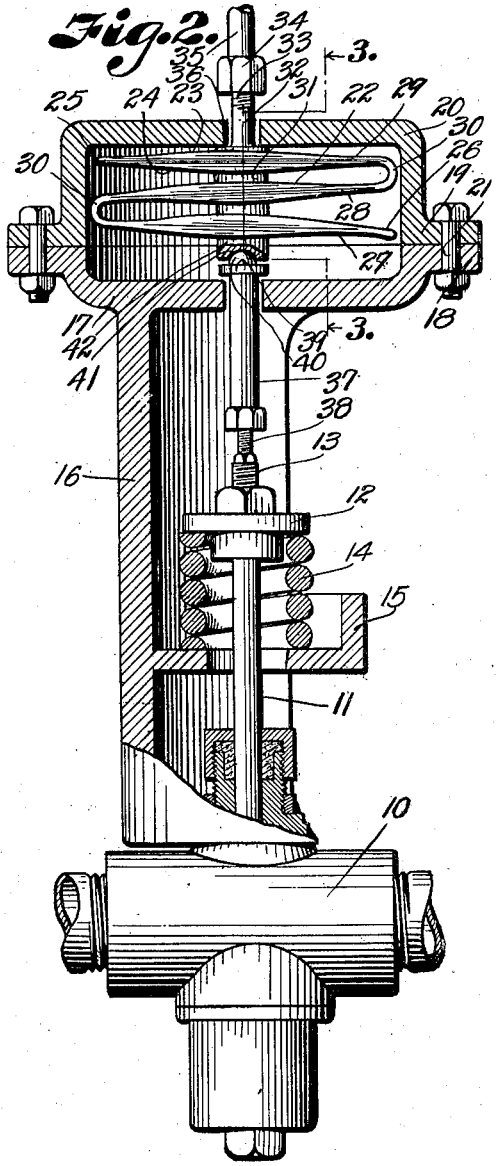
Fig. 2 is a similar view of the device shown in Fig. 1, with the element in expanded condition.
Figure 3:
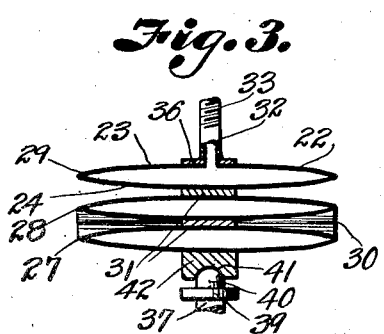
Fig. 3 is a section taken substantially on the line 3—3 of Fig. 2.
Figure 4:
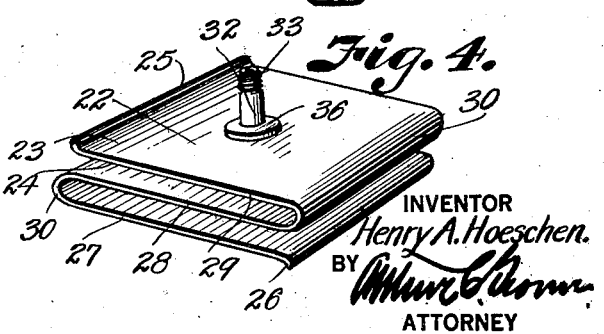
Fig. 4 is a perspective view of the expansible element.

Said upward extension 16 is provided with a laterally extending portion 17 which is cupped out to form part of a housing and which has a flange 18 extending outwardly therefrom to which the flange 19 of the cupped member 20 is secured by means of the securing elements 21. The member 20 completes the housing, with the member 17, for the expansible element 22. Said expansible element preferably is made of a length of tubing which has been flattened so as to have the wall portions 23 and 24 lying opposite each other in adjacency under normal conditions. The opposite ends 25 and 26 of the tube are closed in any suitable manner, as by welding or brazing the same, and in the preferred form of the invention the flattened tubular member is bent so as to provide a plurality of substantially parallel lengths 27, 28 and 29. While three such lengths are shown in the drawings, obviously the number may be either increased or diminished in accordance with the requirements of the device. The lengths 27 and 28 and the lengths 28 and 29 that adjoin are connected by means of integral bends 30 which are arranged on alternating sides of the expansible element, as will be clear from Figs. 1, 2 and 4. In order to hold the adjoining lengths of the expansible element in substantially parallel spaced relationship, a plurality of spacing members 31 which may be in the form of washers of fibrous material, may be mounted between the lengths of said expansible element, being secured thereto in any desired manner.

An inlet tube 32 may be provided with a threaded end 33 to which the internally threaded connector 34 provided on the tubular member 35 may be suitably connected, the member 32 being preferably secured to the member 29 by means of a flange 36 which may be welded, brazed or otherwise secured to said member 29. The tubular member 35 is adapted to conduct an expansible medium such as any fluid under pressure, to the expansible element 22. As the expansible element is confined within the chamber formed by the members 17 and 20, the spring 14 will normally hold the element 22 in engagement with the upper wall portion of the member 20, the pressure being exerted through the rod-like member 37 which is connected with the stem 13 by means of the adjusting screw 38 and which is provided at its opposite end with a flange portion 39 and a rounded ball-like member 40 which engages in a socket 41 provided in a member 42, which is preferably of fibrous composition, secured to the length 27 of said expansible element.

As the pressure of the fluid passing through the tubular member 35 increases, the expansible element 22 will be distorted so that the walls 23 and 24 thereof will tend to separate, the tube tending to assume its original circular form in cross section. This will cause the lengths 27, 28 and 29 to increase in thickness, thus moving the member 42 away from the inlet 29, compressing the spring 14 and unseating the valve in the chamber 10. The movement of the walls of adjoining elements toward each other is avoided due to the interposition of the members 31, and as a result there will be substantially no flexure at the bends 30, the change in contour of the device taking place substantially entirely in the straight runs 27, 28 and 29 thereof, whereby the movable element 37 is caused to be moved out of its normal position to unseat the valve.

Obviously the action of the expansible element can be regulated by means of the adjusting screw 38, as well as by means of the adjustable member 12 which controls the pressure of the spring 14 on the expansible element. It will also be obvious that the action of the device can be multiplied by increasing the number of lengths of the tube that are arranged side by side, and can be simplified if desired even down to a single length, whereby but a very rough control would be obtained as compared with the fineness of control that would be obtained by a multiplicity of such lengths.

What I claim and desire to secure by Letters-Patent is:—

1. In a device of the character described, an expansible element comprising a tubular member having a plurality of lengths arranged side by side, opposed walls thereof being distensible relatively to each other and connected by means of non-expansible integral bends.

2. In a device of the character described, an expansible element comprising a tubular member having a plurality of lengths arranged side by side and connected by means of non-expansible integral bends on alternating sides thereof the walls of said lengths being expansible relatively to said bends.

3. In a device of the character described, an expansible element comprising a tubular member having a plurality of lengths arranged side by side and connected by means of non-expansible integral bends to provide a plurality of connected expansible diaphragms between the bends.

4. In a device of the character described, an expansible element comprising a tubular member having a plurality of lengths arranged side by side and connected by means of integral bends to provide a plurality of communicating expansible diaphragms connected by means of relatively non-expansible portions.

5. In a device of the character described an expansible element comprising a flattened tubular member closed at opposite ends thereof and being bent at intervals of its length to provide a plurality of connected expansible and non-expansible portions throughout the length of the tubular member.

6. In a device of the character described an expansible element comprising a flattened tubular member closed at opposite ends thereof and comprising lengths arranged side by side and an integral connecting portion between adjoining lengths, an inlet for pressure medium on said tubular member and a movable element connected with said tubular member so as to be actuated upon expansion thereof.

7. In a device of the character described an expansible element comprising a continuous tubular element having closed ends and normally flattened and bent at intervals of its length so as to provide opposite extensible walls lying in adjacent relation and non-extensible walls at the bends.

8. In a device of the character described an expansible element comprising a continuous tubular element having closed ends and normally flattened so as to provide opposite walls lying in adjacent relation, an inlet for pressure medium to said tubular element and means for actuating a movable member connected therewith.

9. In a device of the character described, an expansible tubular element which is bent at intervals of its length to provide the tube with communicating extensible and non-extensible portions, the non-extensible portion being located at the bend.

In testimony whereof I affix my signature.

HENRY A. HOESCHEN.